(12) United States Patent
Ito et al.

(10) Patent No.: US 11,772,935 B2
(45) Date of Patent: Oct. 3, 2023

(54) WIRE ROPE INSPECTION SYSTEM AND WIRE ROPE INSPECTION METHOD

(71) Applicant: SHIMADZU CORPORATION, Kyoto (JP)

(72) Inventors: Yasunobu Ito, Kyoto (JP); Wataru Ushio, Kyoto (JP); Nobuyuki Yamaoka, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 60 days.

(21) Appl. No.: 17/609,292

(22) PCT Filed: Apr. 7, 2020

(86) PCT No.: PCT/JP2020/015705
§ 371 (c)(1),
(2) Date: Nov. 5, 2021

(87) PCT Pub. No.: WO2020/246130
PCT Pub. Date: Dec. 10, 2020

(65) Prior Publication Data
US 2022/0212894 A1   Jul. 7, 2022

(30) Foreign Application Priority Data
Jun. 5, 2019  (JP) ................................ 2019-105676

(51) Int. Cl.
*G01N 27/83*   (2006.01)
*B66B 7/12*    (2006.01)

(52) U.S. Cl.
CPC ............ *B66B 7/123* (2013.01); *G01N 27/83* (2013.01)

(58) Field of Classification Search
CPC ................................ B66B 7/123; G01N 27/83
(Continued)

(56) References Cited

U.S. PATENT DOCUMENTS 4,270,088 A * 5/1981 Weischedel ............ G01N 27/82
324/241
5,821,430 A   10/1998 Kwun et al.
(Continued)

FOREIGN PATENT DOCUMENTS

EP    3748351 A1    12/2020
JP    2002116187 A   4/2002
(Continued)

OTHER PUBLICATIONS

Written Opinion of the International Searching Authority dated Jun. 23, 2020 issued for International application No. PCT/JP2020/015705, submitted with a machine translation.
(Continued)

*Primary Examiner* — Christopher P McAndrew
(74) *Attorney, Agent, or Firm* — Muir Patent Law, PLLC

(57) ABSTRACT

This wire rope inspection system (100) is provided with a control unit (21) for performing control to inspect a status of a wire rope (101) based on first measurement data (201a) and second measurement data (201b) that differ in the measurement date and time. The control unit is configured to align a waveform of first measurement data and a waveform of second measurement data such that an inspection operation start point of the elevator of the first measurement data and an inspection operation start point of the elevator of the second measurement data coincide with each other.

6 Claims, 9 Drawing Sheets

(58) Field of Classification Search
USPC .......................................................... 324/240
See application file for complete search history.

(56) References Cited

U.S. PATENT DOCUMENTS

| | | | | |
|---|---|---|---|---|
| 10,514,362 | B2* | 12/2019 | Yoshioka | .............. B66B 7/1215 |
| 2011/0006711 | A1* | 1/2011 | Imura | ...................... H02P 6/08 |
| | | | | 318/400.07 |
| 2011/0268343 | A1* | 11/2011 | Groos | .................... G01N 27/87 |
| | | | | 382/141 |
| 2019/0360965 | A1 | 11/2019 | Ijima | |

FOREIGN PATENT DOCUMENTS

| | | | |
|---|---|---|---|
| JP | 2009122074 A | * | 6/2009 |
| JP | 2013250114 A | | 12/2013 |
| JP | 2019015656 A | | 1/2019 |
| JP | 2019168253 A | * | 10/2019 |
| WO | 2018138850 A1 | | 8/2018 |
| WO | 2019150539 A1 | | 8/2019 |
| WO | WO-2019150539 A1 | * | 8/2019 ............. B66B 7/123 |

OTHER PUBLICATIONS

Extended European Search Report (EESR) dated Jun. 28, 2023 issued by the European Patent Office for the corresponding European patent application No. 20818936.5.

* cited by examiner

Enlarged diagram of Section before operation start - Inspection operation start

More enlarged diagram showing the vicinity of the width section

WIRE ROPE INSPECTION SYSTEM AND WIRE ROPE INSPECTION METHOD

TECHNICAL FIELD

The present invention relates to a wire rope inspection system and a wire rope inspection method.

BACKGROUND OF THE INVENTION

Conventionally, a wire rope inspection device for inspecting a state of a wire rope is known. Such a configuration is disclosed, for example, in WO 2018/138850.

WO 2018/138850 discloses an inspection device for inspecting a state of a steel wire rope. This inspection device is provided with a detection coil for detecting a change in a magnetic field of a steel wire rope and an electronic circuit unit for determining a state of the steel wire rope based on a signal from the detection coil. Further, in the above-described WO 2018/138850, it is disclosed that this inspection device is used in an X-ray imaging apparatus, a ropeway, an elevator, and the like.

PRIOR ART DOCUMENT

Patent Document

Patent Document 1: WO 2018/138850

SUMMARY OF THE INVENTION

Problems to Be Solved by the Invention

Although not specifically disclosed in the above-described WO 2018/138850, there is a technique in which a wire rope is inspected by using two measurement data that differ from each other in the measurement date and time. In this technique, the two measurement data that differ in the measurement date and time are aligned, and the difference between the two measurement data in which the waveforms have been aligned is acquired. Then, the state of the wire rope is inspected based on the acquired difference. With this, the state of the wire rope is inspected in a state in which noise due to the inherent magnetic characteristics of the wire rope has been removed.

In the alignment of the waveforms between the measurement data of the above-described technique, the information on the position of the wire rope (information on the encoder of the elevator, etc.) is acquired from the elevator by the wire rope inspection device. By associating the measurement data, the corresponding point between the measurement data can be easily grasped. Thus, the alignment of the waveforms between measurement data can be easily performed. However, in a case where the wire rope inspection device cannot acquire the information on the position of the wire rope from the elevator, the corresponding point between the measurement data cannot be known, and therefore there is a problem that it is difficult to perform the alignment of waveforms between the measurement data.

The present invention has been made to solve the aforementioned problems. One object of the present invention is to provide a wire rope inspection system and a wire rope inspection method capable of performing alignment of waveforms between measurement data via simple processing even in a case where information on a position of a wire rope cannot be obtained from an elevator.

Means for Solving the Problem

In order to attain the above-described object, a wire rope inspection system according to a first aspect of the present invention is provided with:
  a detection coil configured to detect a change in a magnetic field of a wire rope for driving an elevator: and
  a control unit configured to perform control to inspect a state of the wire rope based on first measurement data and second measurement data acquired by the detection coil at a time of an inspection operation of the elevator, the first measurement data and the second measurement data being different in measurement date and time from each other,
  wherein the control unit is configured to
  extract an inspection operation start point of the elevator from each of the first measurement data and the second measurement data, and
  align waveforms of the first measurement data and the second measurement data such that an inspection operation start point of the elevator of the extracted first measurement data and an inspection operation start point of the elevator of the extracted second measurement data coincide with each other.

A wire rope inspection method according to a second aspect of the present invention includes the steps of:
  detecting a change in a magnetic field of a wire rope for driving an elevator; and
  inspecting a state of the wire rope, based on first measurement data and second measurement data acquired at a time of an inspection operation of the elevator, the first measurement data and the second measurement data being different in measurement date and time from each other,
  wherein the step of inspecting the state of the wire rope includes the steps of:
  extracting an inspection operation start point of the elevator from each of the first measurement data and the second measurement data; and
  aligning a waveform of the first measurement data and a waveform of the second measurement data such that an inspection operation start point of the elevator of the extracted first measurement data and an inspection operation start point of the elevator of the extracted second measurement data coincide with each other.

Effects of the Invention

According to the present invention, as described above, the inspection operation start point of the elevator (i.e., information on the position of the wire rope) is extracted from the measurement data, and the alignment of the waveforms between the measurement data is performed. This enables the alignment of the waveforms between the measurement data even if the information on the position of the wire rope cannot be acquired from the elevator. Further, the positioning of the waveforms between the measurement data can be performed by simply aligning the inspection operation start points extracted from each measurement data, and therefore the positioning of the waveforms between the measurement data can be performed easily. Consequently, the alignment of waveforms between measurement data can be performed via simple processing even in a case where the information on the position of the wire rope cannot be acquired from the elevator.

Figure 11:
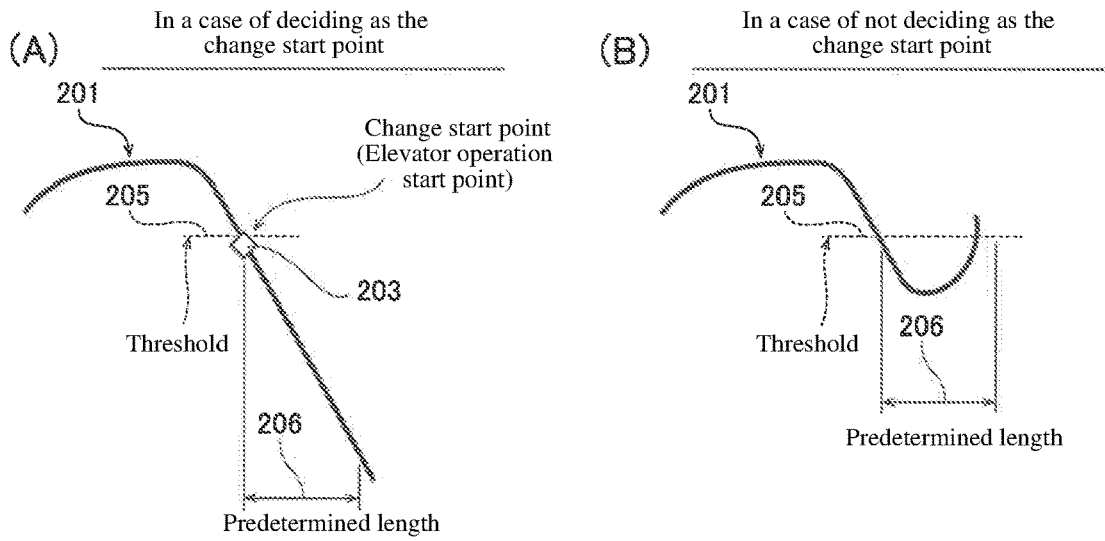

(A) in FIG. 11 is a diagram for explaining a case in which a measurement point that has exceeded a threshold by the wire rope inspection device according to one embodiment as the inspection operation start point of the elevator. (B) in FIG. 11 is a diagram for explaining a case in which the measured point that has exceeded the threshold by the wire rope inspection device according to one embodiment is not determined as the inspection operation start point of the elevator.

Figure 12:
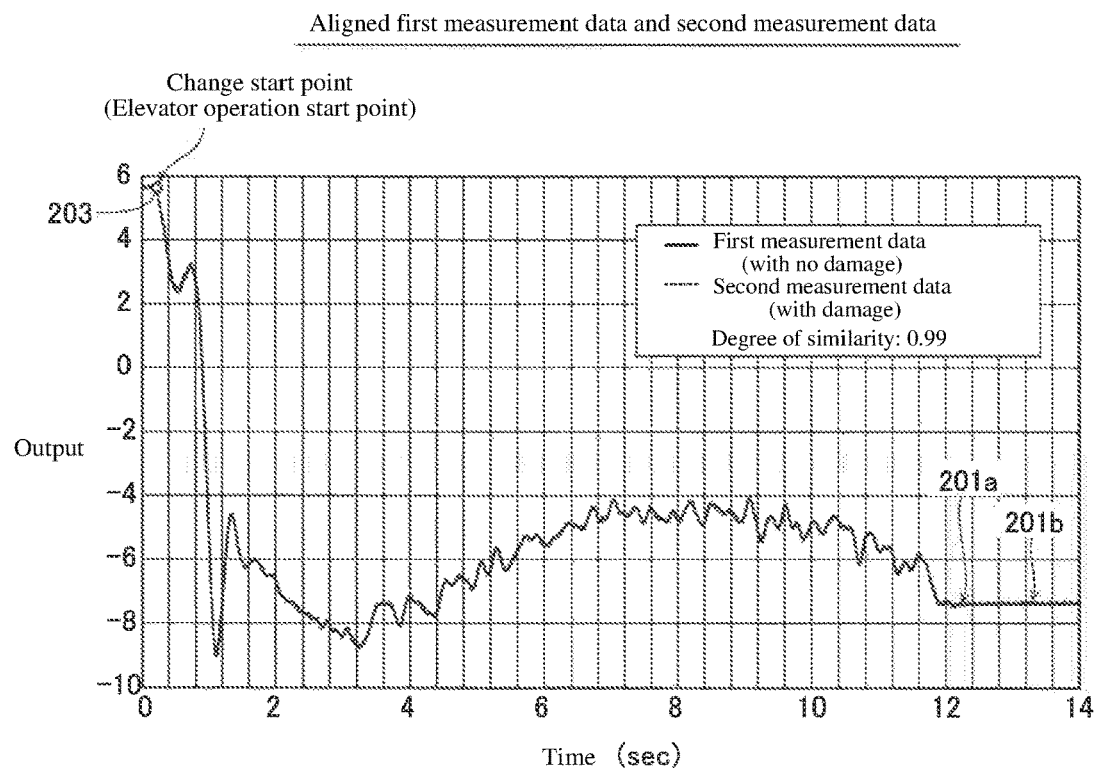

FIG. 12 is a diagram showing first measurement data and second measurement data in which waveforms have been aligned according to one embodiment.

Figure 13:
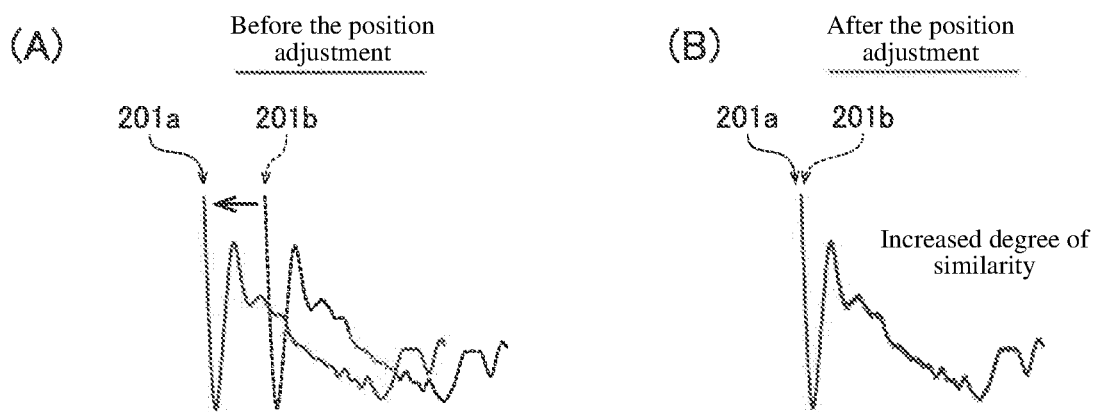

FIG. 13 is a diagram for explaining the position adjustment of the first measurement data and the second measurement data in which the waveforms have been aligned according to one embodiment.

Figure 14:
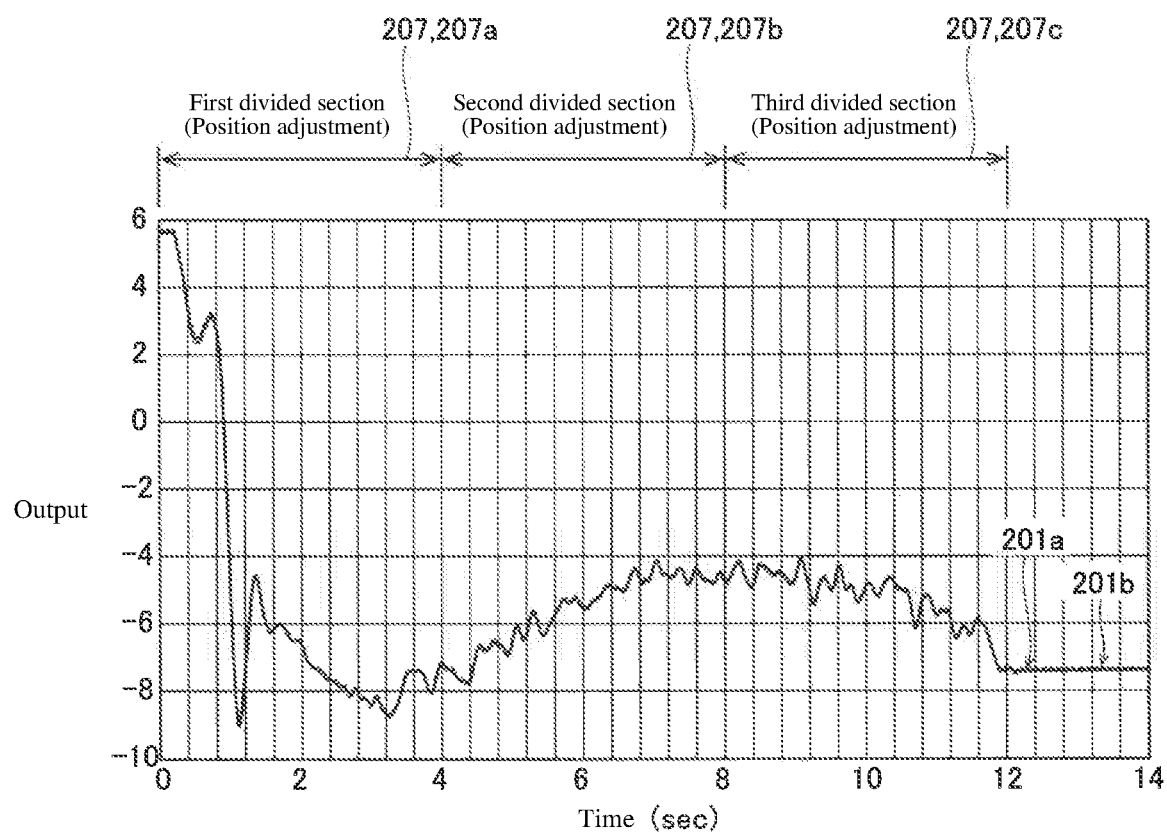

FIG. 14 is a diagram for explaining the position adjustment for each divided section of the first measurement data and the second measurement data in which waveforms have been aligned according to one embodiment.

Figure 15:
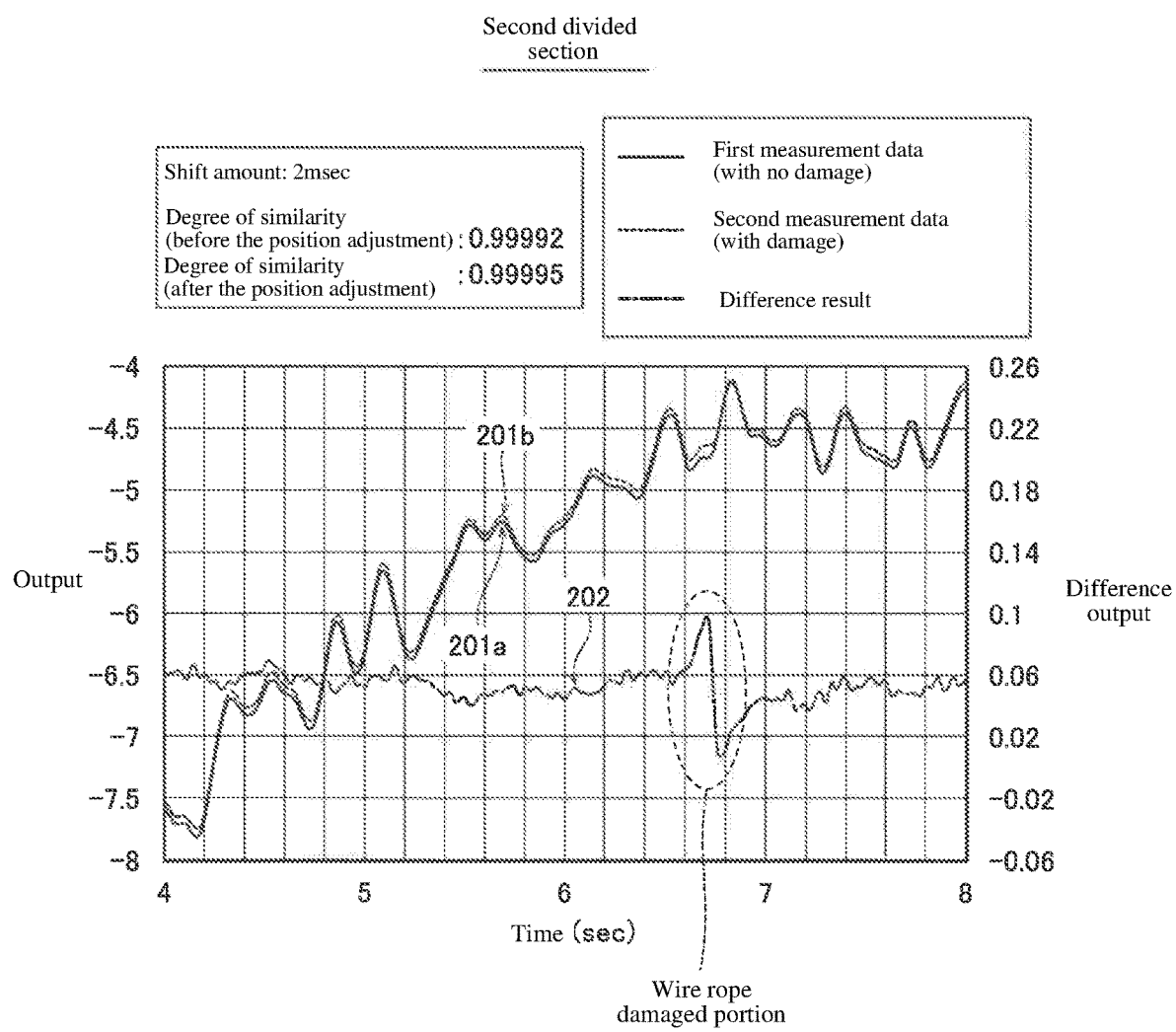

FIG. 15 is a diagram for explaining the position adjustments in the second divided section of FIG. 14.

EMBODIMENTS FOR CARRYING OUT THE INVENTION

Hereinafter, some embodiments in which the present invention is embodied will be described with reference to the attached drawings.

First, referring to FIGS. 1 to 6, the entire configuration of a wire rope inspection system 100 according to one embodiment will be described.

(Configuration of Wire Rope Inspection System)

Figure 1:
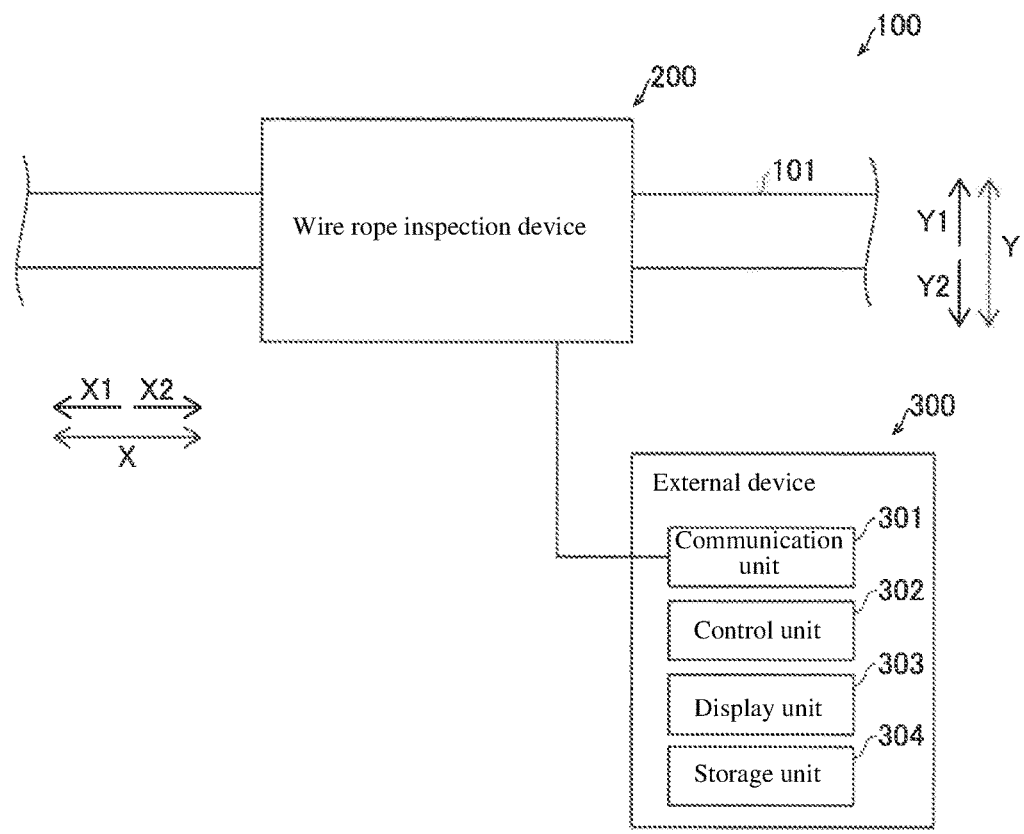
FIG. 1 is a schematic diagram showing a configuration of a wire rope inspection system according to one embodiment.

As shown in FIG. 1, the wire rope inspection system 100 is a system for inspecting a wire rope 101 as an inspection target. The wire rope inspection system 100 is provided with a wire rope inspection device 200 for magnetically sensing the state of the wire rope 101 and an external device 300 for analyzing the state of the wire rope 101. The wire rope inspection system 100 is configured to inspect the damage of the wire rope 101 by the wire rope inspection device 200 and the external device 300.

Note that the damage of the wire rope 101 is a broad concept, including a change in the cross-sectional area, a change in the magnetic permeability, and a portion where the wire rope 101 becomes non-uniform. The change in the cross-sectional area is a change with respect to the sensing direction caused by rubbing, localized wear, wire strand disconnection, dent, corrosion, crack, folding, etc. The change in the cross-sectional area includes a change caused by a gap when damage or the like occurs inside the wire rope 101. The change in the magnetic permeability is caused by rust, weld burning, mixing of impurities, compositional change, and the like of the wire rope 101.

(Wire Rope Inspection Device)

Figure 2:
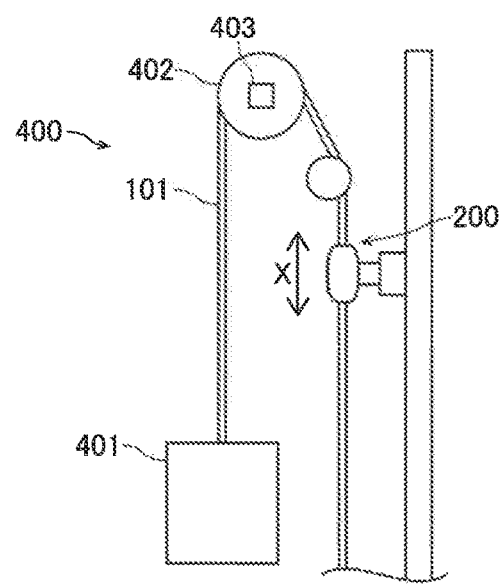
FIG. 2 is a schematic diagram showing an elevator using a wire rope to be inspected by the wire rope inspection device according to the embodiment.

As shown in FIG. 2, the wire rope inspection device 200 inspects the wire rope 101 while moving relatively along the wire rope 101 as an inspection target. The wire rope 101 is a rope for driving the elevator 400. The elevator 400 includes a cage unit 401, a hoisting machine 402 for raising and lowering the cage unit 401 by winding the wire rope 101, and a position sensor 403 for detecting the position of the cage unit 401 (wire rope 101). In the elevator 400, the wire rope 101 is moved by the hoisting machine 402. Therefore, in a state in which the wire rope inspection device 200 is fixed, the wire rope is inspected in accordance with the movement of the wire rope 101. The wire rope 101 is arranged so as to extend in the X-direction at the position of the wire rope inspection device 200.

Figure 3:
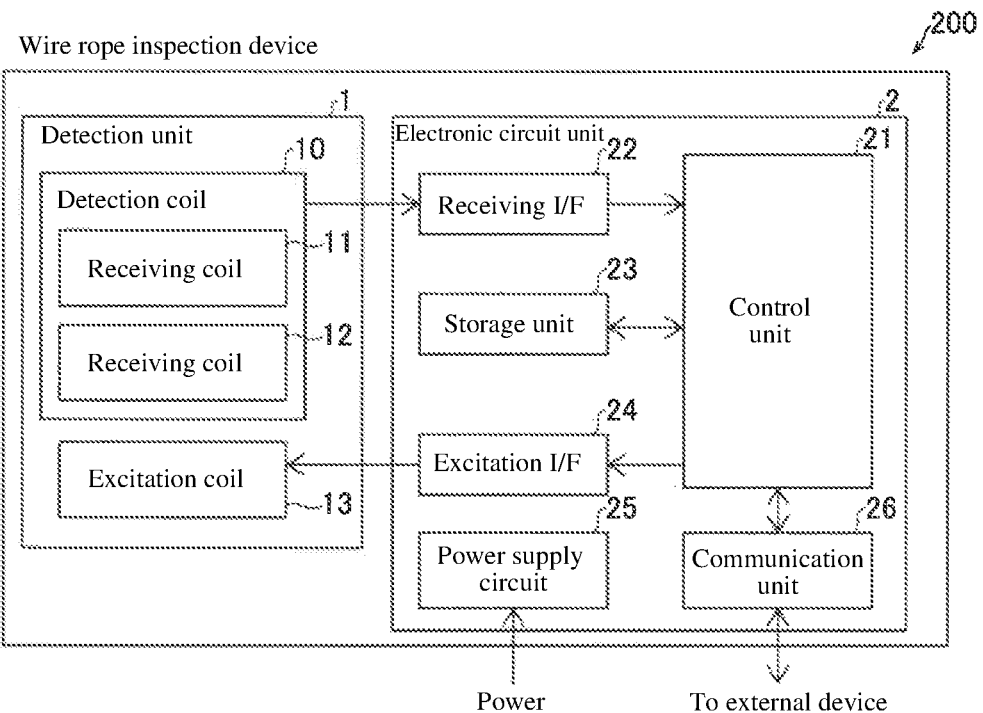
FIG. 3 is a block diagram showing a control configuration of the wire rope inspection device according to the embodiment.

As shown in FIG. 3, the wire rope inspection device 200 is provided with a detection unit 1 and an electronic circuit unit 2. The detection unit 1 includes a detection coil 10 which is a differential coil having a pair of receiving coils 11 and 12 and an excitation coil 13. The electronic circuit unit 2 includes a control unit 21, a receiving I/F 22, a storage unit 23, an excitation I/F 24, a power supply circuit 25, and a communication unit 26. Further, the wire rope inspection device 200 is provided with magnetic field application units 4 (see FIG. 4).

The wire rope inspection device 200 is communicatively connected to an external device 300 via the communication unit 26.

As shown in FIG. 1, the external device 300 is provided with a communication unit 301, a control unit 302, a display unit 303, and a storage unit 304. The external device 300 is configured to receive the measurement data of the wire rope 101 by the wire rope inspection device 200 via the communication unit 301. Further, the external device 300 is configured to analyze the type of damage, such as, e.g., a wire strand disconnection and a cross-sectional area change, by the control unit 302, based on the received measurement data of the wire rope 101. Further, the external device 300 is configured to display the analysis result on the display unit 303. Further, the external device 300 is configured to perform abnormality determination based on the analysis result and display the result on the display unit 303. Further, the external device 300 is configured to store the measurement data, the analysis result, etc., of the wire rope 101 in the storage unit 304.

Figure 4:
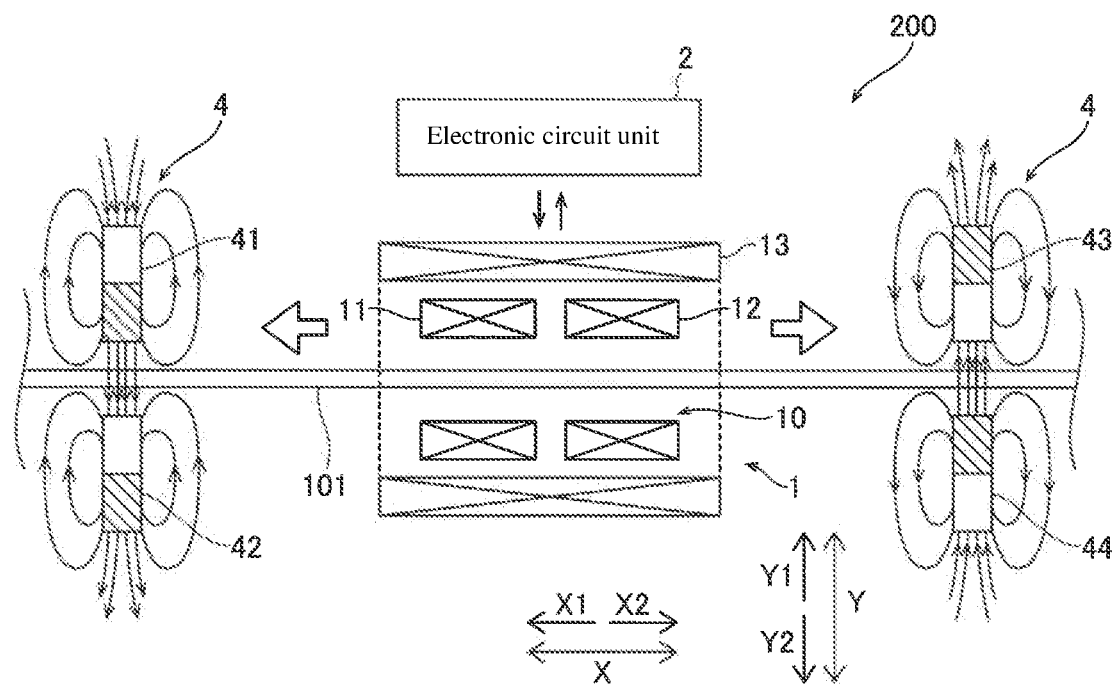
FIG. 4 is a diagram for explaining the configuration of a magnetic field application unit and a detection unit of a magnetic body inspection device according to one embodiment.

As shown in FIG. 4, the wire rope inspection device 200 is configured to detect the change in the magnetic field (magnetic flux) of the wire rope 101 by the detection coil 10. It is configured such that a DC magnetization device is not arranged in the vicinity of the coil of the wire rope inspection device 200.

The change in the magnetic field is a broad concept that includes temporal changes in the intensity of the magnetic field as described below. That is, the change in the magnetic field includes temporal changes in the intensity of the magnetic field of the wire rope 101 to be detected by the detection unit 1 by relatively moving the wire rope 101 and the detection unit 1. Further, the change in the magnetic field includes temporal changes in the intensity of the magnetic field to be detected by the detection unit 1 by temporally changing the magnetic field applied to the wire rope 101.

The wire rope inspection device 200 is configured to eliminate noise data (changes in the inherent magnetic characteristics) included in the measurement data of the wire rope 101, based on the measurement data that mutually differ in the measurement date and time. The measurement data is the first measurement data 201a and the second measurement data 201b described later. The measurement data will be detailed later.

(Configuration and Characteristics of Wire Rope)

The wire rope 101 is formed by braiding (e.g., strand-braiding) magnetic wire materials. The wire rope 101 is, for example, a wire rope made of steel (steel wire rope). The wire rope 101 is a magnetic body formed of an elongated member extending in the X-direction. In the wire rope 101, the state (presence or absence of damage or the like) is being monitored to prevent the breakage due to deterioration. The wire rope 101 progressed in the deterioration beyond a predetermined amount will be replaced.

The wire rope 101 has inherent magnetic characteristics. The inherent magnetic characteristics denote magnetic characteristics that vary due to the degree of uniformity of the twist or the degree of uniformity of the amount of the steel material at the cross-section perpendicular to the longitudinal direction (X-direction) of the wire rope 101. Note that the degree of uniformity of the twist of the wire rope 101 and the degree of uniformity of the amount of the steel material do not substantially change over time (or are less likely to greatly change over time). For this reason, the output of the wire rope inspection device 200 at each position of the wire rope 101 in the longitudinal direction (X-direction) becomes substantially the same for each measurement at time points that mutually differ from each other. That is, the measurement is performed with good reproducibility.

Figure 5:
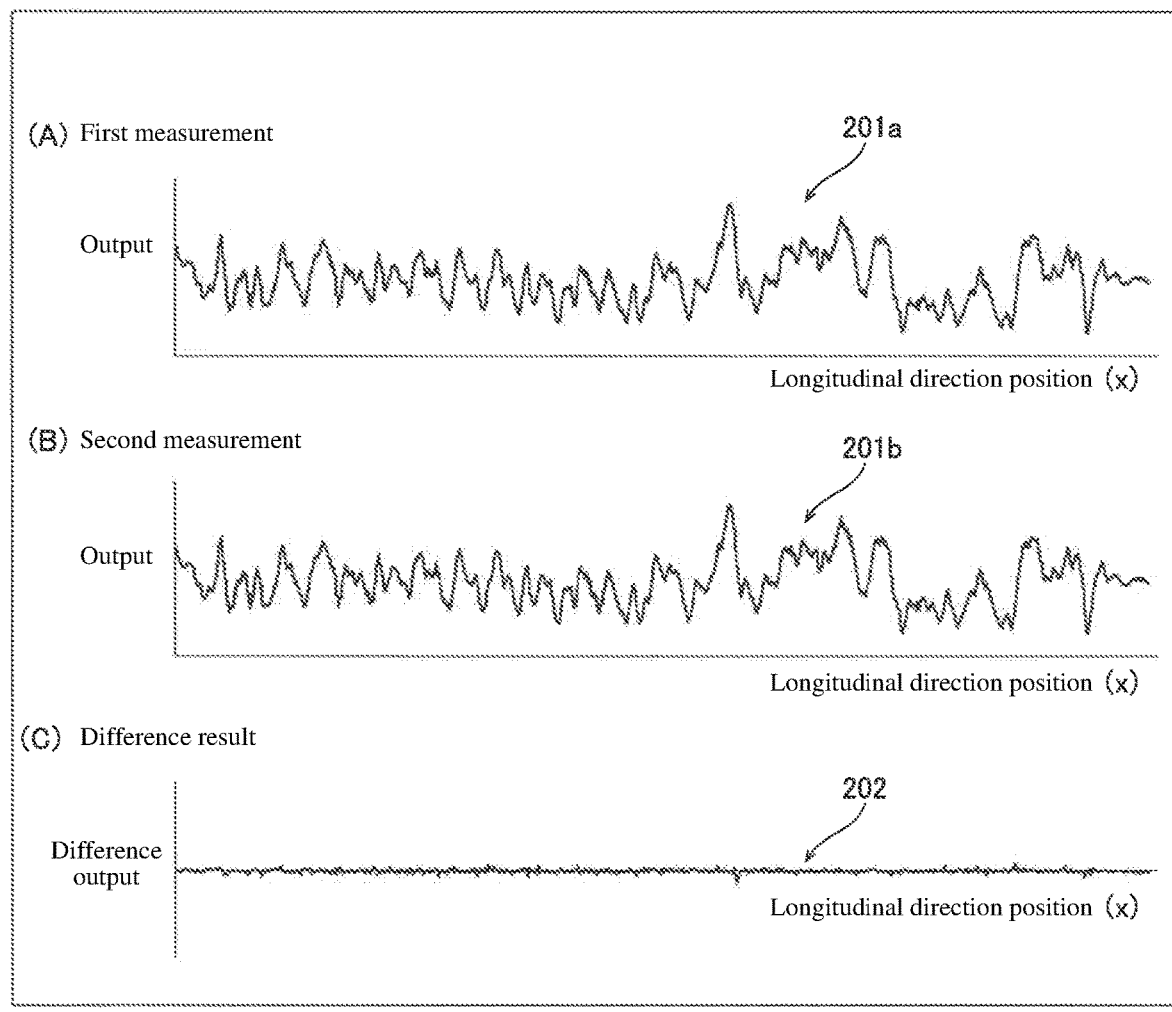
FIG. 5 is a diagram for explaining magnetic characteristics inherent to a wire rope according to one embodiment.

Specifically, (A) of FIG. 5 shows the outputs at a predetermined position of the wire rope 101 in the longitudinal direction obtained by the first measurement according to the wire rope inspection device 200. (B) of FIG. 5 shows the outputs at a predetermined position of the wire rope 101 in the longitudinal direction obtained by the second measurement performed after the first measurement. Both of these outputs are substantially the same.

Therefore, when the difference at substantially the same position of the wire rope in the longitudinal direction (X-direction) is obtained, the output waveform small in the amplitude as shown in (C) of FIG. 5 is obtained in which the inherent noise data has been eliminated. That is, the outputs based on the change in each inherent magnetic characteristics of the wire ropes 101 at the first measurement and the second measurement are canceled, and therefore a relatively flat output waveform as shown in (C) of FIG. 5 can be obtained. Such a result can be similarly acquired in either case of a relatively short period (e.g., a period of several seconds, or a period of several minutes) and a relatively long period (e.g., a period of several months, or a period of several years) between the first measurement and the second measurement.

(Configuration of Magnetic Field Application Unit)

As shown in FIG. 4, the magnetic field application unit 4 is configured to apply a magnetic field in advance to the wire rope 101 which is an inspection target in the Y-direction (the direction intersecting the extending direction of the wire rope 101). With this, the magnitude and the direction of the magnetization of the wire rope 101, which is a magnetic body, is adjusted. Further, the magnetic field application unit 4 includes a first magnetic field application unit including magnets 41 and 42 and a second magnetic field application unit including magnets 43 and 44. The first magnetic field application unit (magnets 41 and 42) is arranged on one side (X1-direction side) of the extending direction of the wire rope 101 with respect to the detection unit 1. Further, the second magnetic field application unit (magnet 43 and 44) is arranged on the other side (X2-direction side) of the extending direction of the wire rope 101 with respect to the detection unit 1.

The first magnetic field application unit (magnets 41 and 42) is configured to apply a magnetic field in parallel to the plane intersecting the extending direction (X-direction) of the wire rope 101 and in the Y2-direction. The second magnetic field application unit (magnets 43 and 44) is configured to apply a magnetic field in parallel to the plane intersecting the extending direction (X-direction) of the wire rope 101 and in the Y1-direction. That is, the magnetic field application unit 4 is configured to apply a magnetic field in a direction substantially perpendicular to the X-direction, which is the longitudinal direction of the elongated material.

(Configuration of Detection Unit)

The detection coil 10 (receiving coils 11 and 12) and the excitation coil 13 each are wound a plurality of times along a longitudinal direction about a central axis extending the extending direction of the wire rope 101, which is a magnetic body formed of an elongated member. Further, the detection coil 10 and the excitation coil 13 each are a coil including a conducting wire portion formed in a cylindrical shape along the X-direction (longitudinal direction) along which the wire rope 101 extends. Therefore, the surface forming the wound conducting wire portion of each of the detection coil 10 and the excitation coil 13 is substantially perpendicular to the longitudinal direction. The wire rope 101 passes through the inside of the detection coil 10 and the excitation coil 13. Further, the detection coil 10 is provided inside the excitation coil 13. The arrangement of the detection coil 10 and that of the excitation coil 13 are not limited to the arrangement described above. The receiving coil 11 of the detection coil 10 is arranged on the X1-direction side. Further, the receiving coil 12 of the detection coil 10 is arranged on the X2-direction side. The receiving coils 11 and 12 are arranged to be spaced apart from each other by several millimeters to several centimeters.

The excitation coil 13 excites the magnetization state of the wire rope 101. Specifically, the excitation coil 13 is configured such that when an excitation AC current is caused to flow through the excitation coil 13, the magnetic field generated based on the excitation AC current is applied to the inside of the excitation coil 13 along the X-direction.

The detection coil 10 is configured to transmit the differential signal of the pair of receiving coils 11 and 12. Specifically, the detection coil 10 is configured to detect the change in the magnetic field of the wire rope 101 and transmit the differential signal. The detection coil 10 is configured to detect the change in the magnetic field of the wire rope 101, which is an inspection target, in the X-direction and output the detection signal (voltage). That is, the detection coil 10 detects the change in the magnetic field in the X-direction intersecting the Y-direction, with respect to the wire rope 101 to which the magnetic field was applied in the Y-direction by the magnetic field application unit 4. The detection coil 10 is configured to output the differential signal (voltage) based on the detected change in the magnetic field of the wire rope 101 in the X-direction. Further, the detection coil 10 is arranged such that substantially all of the magnetic fields generated by the excitation coil 13 can be detected (input).

In a case where there is a defect (damage, etc.) in the wire rope 101, the total magnetic flux (value obtained by multiplying the magnetic field by the magnetic permeability and the area) of the wire rope 101 becomes small at the point where there is defect (damage, etc.). Consequently, for example, when the receiving coil 11 is positioned at the portion where there is defect (damage, etc.), the amount of magnetic flux passing through the receiving coil 12 is changed as compared with the amount of magnetic flux passing thorough the receiving coil 11. Therefore, the absolute value (differential signal) of the difference in the detected voltage by the detection coil 10 is increased. On the other hand, the differential signal at the portion where there is no defect (scratches, etc.) becomes substantially zero. Thus, in the detection coil 10, a clear signal (signal with a good S/N ratio) indicating the presence of the defect (damage, etc.) is detected. Thus, the electronic circuit unit 2 can detect the presence of defect (damage, etc.) of the wire rope 101 based on the value of the differential signal.

(Configuration of Electronic Circuit Unit)

The control unit 21 of the electronic circuit unit 2 shown in FIG. 3 is configured to control each part of the wire rope inspection device 200. Specifically, the control unit 21 includes a processor, such as, e.g., a CPU (Central Processing Unit), a memory, and an AD converter.

The control unit 21 is configured to receive the differential signal from the detection coil 10 to detect the state of the wire rope 101. Further, the control unit 21 is configured to perform control to excite the excitation coil 13. Further, the control unit 21 is configured to transmit the detection result of the state of the wire rope 101 to the external device 300 via the communication unit 26.

The receiving I/F 22 is configured to receive the differential signal from the detection coil 10 and transmit it to the control unit 21. Specifically, the receiving I/F 22 includes an amplifier. Further, the receiving I/F 22 is configured to amplify the differential signal of the detection coil 10 and transmits it to the control unit 21. The storage unit 23 includes a storage media, such as, e.g., an HDD and an SSD, and is configured to store information, such as, e.g., the first measurement data 201a and the second measurement data 201b.

The excitation I/F 24 is configured to receive a control signal from the control unit 21 to control the power supply to the excitation coil 13. Specifically, the excitation I/F 24 controls the power supply from the power supply circuit 25 to the excitation coil 13 based on the control signal from the control unit 21.

Figure 6:
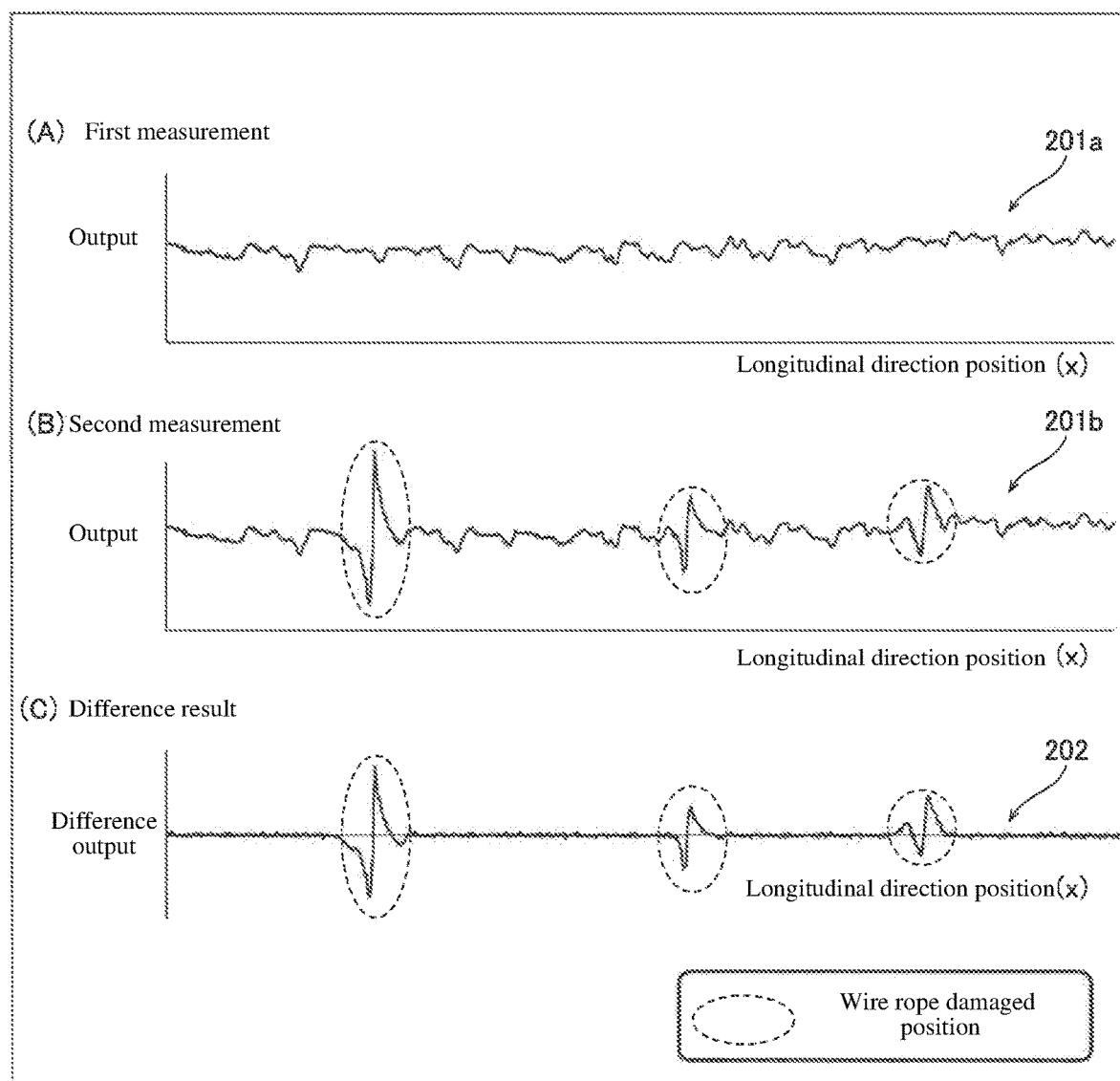
FIG. 6 is a diagram showing output waveforms of first measurement data, second measurement data, and a difference between the first measurement data and the second measurement data, obtained by a wire rope inspection device according to one embodiment.

As shown in (A) to (C) of FIG. 6, the control unit 21 is configured to align the waveforms of the first measurement data 201a and the second measurement data 201b. The first measurement data 201a is the data acquired by the detection coil 10 in the first measurement. The second measurement data 201b is the data acquired by the detection coil 10 in the second measurement performed after the first measurement. The control unit 21 is configured to acquire the difference 202 (difference data) between the first measurement data 201a and the second measurement data 201b in which the waveforms have been aligned. Further, the control unit 21 is configured to perform control to inspect the state of the wire rope 101, based on the acquired difference 202.

As shown in (A) to (C) in FIG. 6, by acquiring the difference 202 between the first measurement data 201a and the second measurement data 201b in which the waveforms have been aligned, the outputs based on the change in the inherent magnetic characteristic of the wire rope 101 are canceled. Consequently, the state of the wire rope 101 can be inspected in a state in which the damaged portion and the non-damaged portion of the wire rope 101 can be clearly distinguished.

(Alignment of Waveforms Between Measurement Data)

Referring now to FIGS. 7-15, the alignment of the waveforms of the first measurement data 201a and the second measurement data 201b will be described. In detail, the alignment of the waveforms of the first measurement data 201a and the second measurement data 201b in a case where the information (information on the position sensor 403) on the position of the wire rope 101 cannot be acquired from the elevator 400 will be described.

In this embodiment, as shown in FIGS. 7 to 15, first, the control unit 21 performs control to extract the inspection operation start point 203 (see FIG. 9) of the elevator 400 from each of the first measurement data 201a and the second measurement data 201b. Then, the control unit 21 is configured to align (superimpose) the waveforms of the first measurement data 201a and the second measurement data 201b. The alignment of the waveforms is performed such that the extracted inspection operation start point 203 of the elevator 400 of the first measurement data 201a and the extracted inspection operation start point 203 of the elevator 400 of the second measurement data 201b coincide with each other. Hereinafter, in cases where there is no need to distinguish between the first measurement data 201a and the second measurement data 201b, the data will be referred to as measurement data 201.

<Inspection Operation of Elevator>

Figure 7:
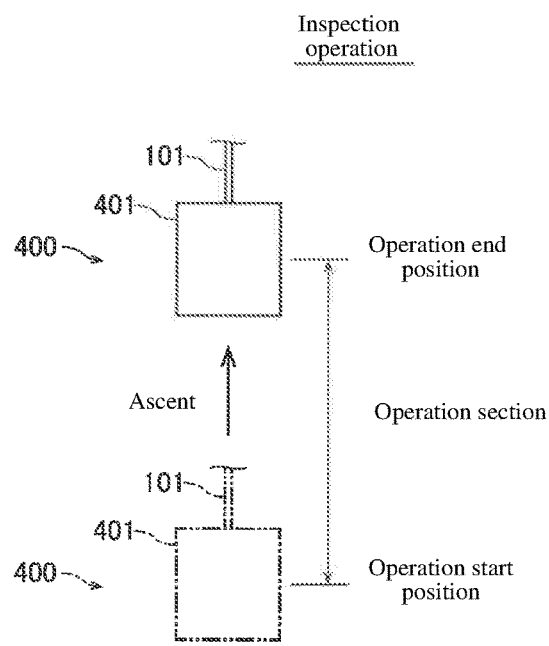
FIG. 7 is a diagram for explaining an inspection operation of an elevator according to one embodiment.

As shown in FIG. 7, by causing the elevator 400 to perform a predetermined inspection operation, measurement data 201 at the time of the inspection operation of the elevator 400 is acquired by the detection coil 10. In the inspection operation, the elevator 400 is moved from a predetermined inspection operation start position to a predetermined inspection operation end position. The moving speed of the elevator 400 at the time of the inspection operation may be set to a constant speed which is slower than the moving speed of the elevator 400 at the time of carrying a load, such as, e.g., a person and a load, from the viewpoint of acquiring measurement data 201 suitable for the alignment of waveforms. In other words, the moving speed can be set to a constant speed which is slower than the moving speed of the elevator 400 at the normal operation.

Further, the inspection operation can be, but not limited thereto, a moving operation from the position on the lowest floor, which is the inspection operation start position, to the position on the highest floor, which is the inspection operation end position, for example. Note that, in FIG. 7, an example is shown in which the elevator 400 is raised at the time of the inspection operation, but the moving direction of the elevator 400 at the time of the inspection operation is not particularly limited. In other words, the elevator 400 may be lowered at the time of the inspection operation.

The wire rope inspection device 200 starts detecting the change in the magnetic field of the wire rope 101 by the detection coil 10 before the inspection operation of the elevator 400. Then, after completion of the inspection operation of the elevator 400, the wire rope inspection device 200 terminates the detection of the change in the magnetic field of the wire rope 101 by the detection coil 10. With this, the measurement data 201 from the time before the inspection operation start to the time after the inspection operation end can be acquired by the detection coil 10.

<Measurement Data at the Time of Inspection Operation of Elevator>

Figure 8:
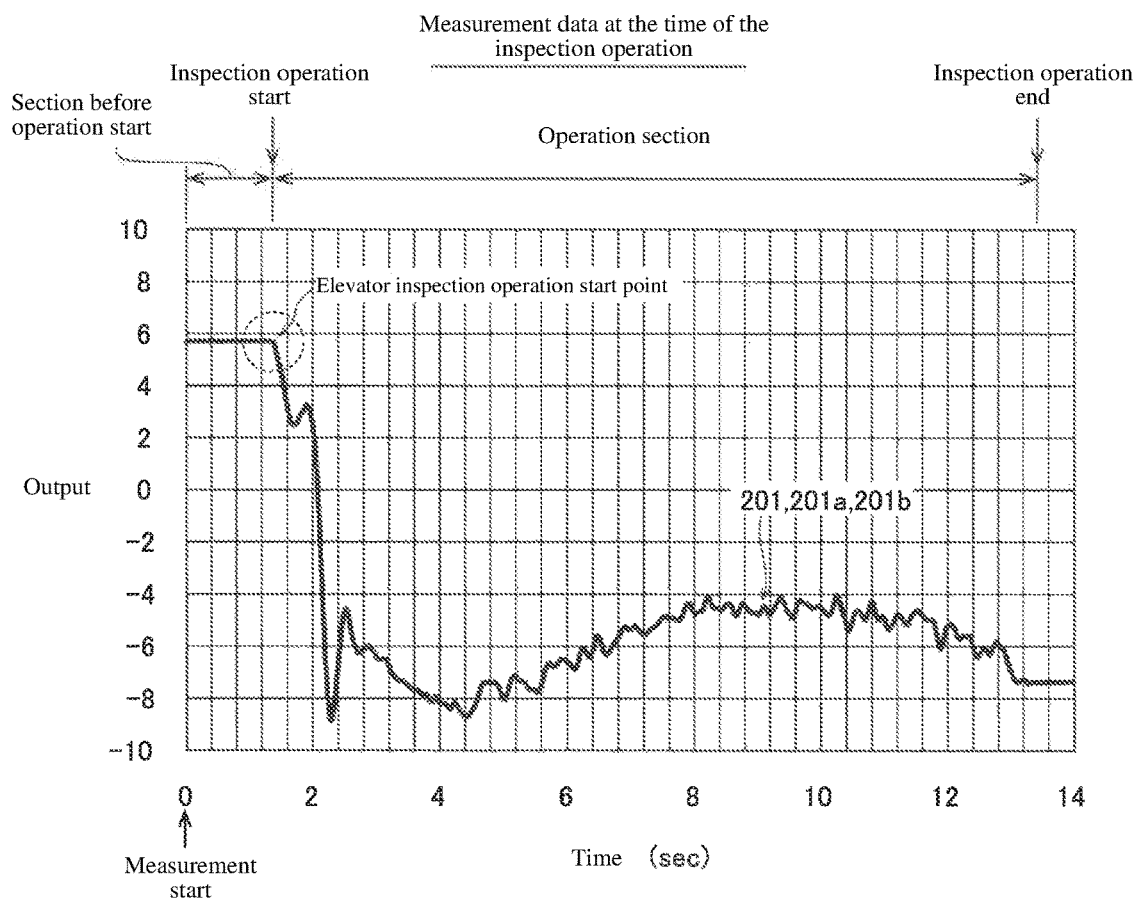
FIG. 8 is a diagram for explaining measurement data at the time of an inspection operation of an elevator according to one embodiment.

Referring to FIG. 8, the measurement data 201 acquired by the detection coil 10 at the time of the inspection operation of the elevator 400 will be described. In the graph shown in FIG. 8, the vertical axis represents the output value (voltage value, etc.) of the detection coil 10 at the time of the measurement, and the horizontal axis represents the time at the time of the measurement. Note that the vertical axis and the horizontal axis of the graph in FIG. 9, FIG. 10, FIG. 12, FIG. 14, and FIG. 15 are also the same as those of the graph shown in FIG. 8.

As shown in FIG. 8, the measurement data 201 includes the data in the section before the inspection operation start of the elevator 400 and the data in the section during the inspection operation of the elevator 400. In the data in the section before the inspection operation start of the elevator 400, the elevator 400 is stopped at the inspection operation start position and has not been moved, and the detection coil 10 measures the fixed point of the wire rope 101. Therefore, it becomes a flat section indicating the waveform with a substantially constant value. On the other hand, in the data in the section during the inspection operation of the elevator 400, the elevator 400 is moved from the inspection operation start position to the inspection operation end position, and the detection coil 10 measures the respective points of the moving wire rope 101. Thus, the section during the inspection operation of the elevator 400 becomes a zigzag section in which the waveform does not exhibit a substantially constant value.

Further, in the measurement data 201, at the time of the inspection operation start of the elevator 400, the measurement value is rapidly changed due to the change in the measurement position of the wire rope 101 by the detection coil 10.

<Extraction of Inspection Operation Start Point of Elevator>

Figure 9:
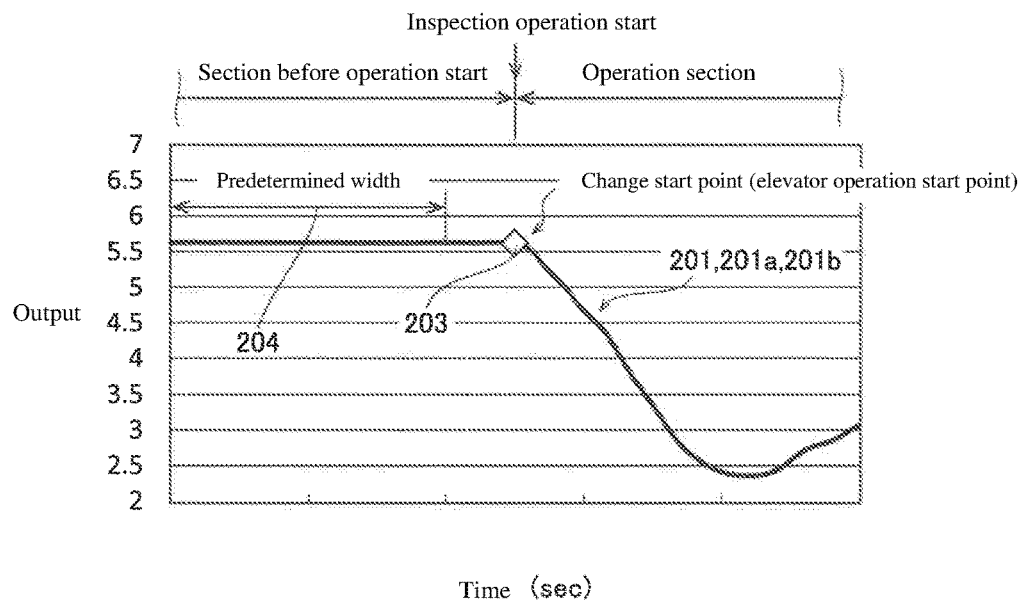
FIG. 9 is an enlarged view showing a section before the operation start—the vicinity of the inspection operation start of the measurement data shown in FIG. 8.

Therefore, as shown in FIG. 9, the control unit 21 is configured to perform control to extract the change start point (the start point of the rapid change) of the measurement value (output value) from the section before the inspection operation start of the elevator 400 as the inspection operation start point of the elevator 400. At this time, the control unit 21 is configured to perform control to determine the change start point of the measurement value, based on the measurement value in the section before the inspection operation start of the elevator 400.

In the embodiment shown in FIG. 9, the control unit 21 performs the following control. That is, the control unit 21 extracts a measurement value of a predetermined width 204 out of the measurement value in the section before the inspection operation start of the elevator 400, from the measurement data 201. Further, the control unit 21 performs control to determine the change start point of the measurement value, based on the extracted measurement value in the width 204. The width 204 can be set by, for example, a time, the number of measuring points, or the like. As a specific example, the width 204 may be set to, for example, 0.4 sec.

Figure 10:
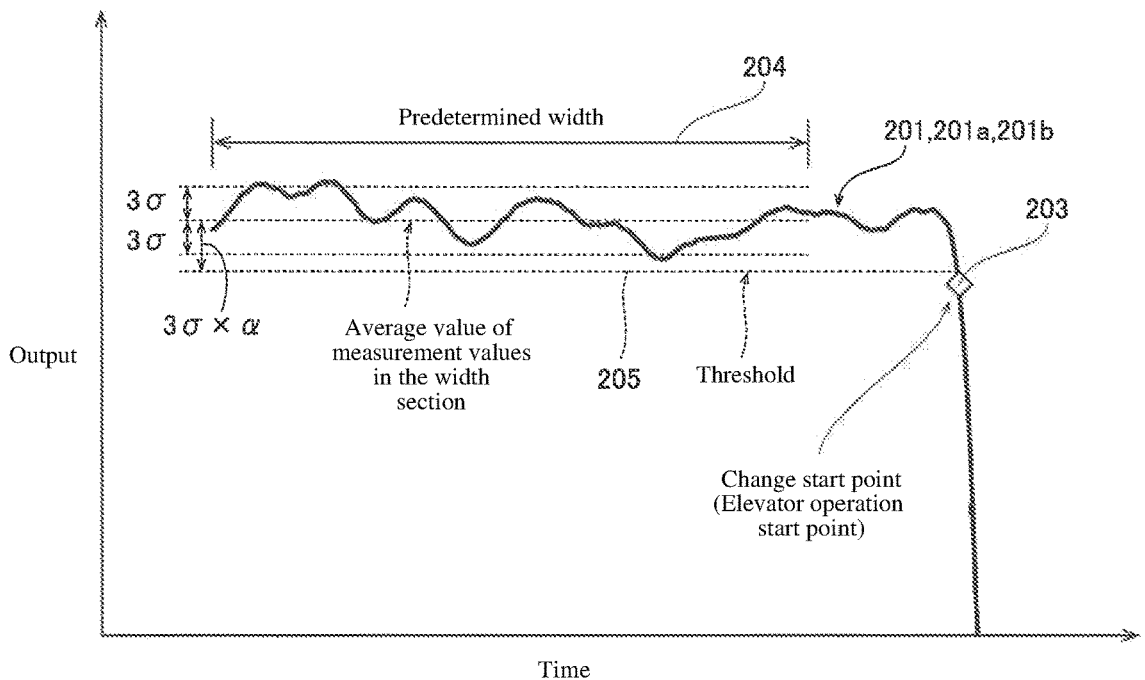
FIG. 10 is an enlarged view showing the vicinity of the section of the predetermined width of the measurement data shown in FIG. 9.

As shown in FIG. 10, the following control is performed as the determination control of the change start point of the measurement value. That is, first, the control unit 21 performs control to acquire the standard deviation σ indicating minute fluctuations (minute fluctuation width) of the measurement value in the section before the inspection operation start of the elevator 400, based on the measurement value (e.g., the measurement value in the width 204) in the section before the inspection operation start of the elevator 400. Then, the control unit 21 performs control to determine the change start point of the measurement value, considering the acquired standard deviation σ. Specifically, the control unit 21 performs control to acquire a threshold 205 for determining the change start point of the measurement value, based on the acquired standard deviation σ. Then, the control unit 21 performs control to determine the point that has exceeded the acquired threshold 205 as the change start point of the measurement value.

In the example shown in FIG. 10, the control unit 21 performs control to acquire the standard deviation σ indicating minute fluctuations in the measurement value in the section in the width 204, based on the measurement value in the width 204 and determine the threshold 205, based on the acquired standard deviation σ. More specifically, the control unit 21 performs control to determine, as the threshold 205, the value apart from the average value of the measurements in the section of the width 204 by the value acquired by multiplying three times (3σ) of the standard deviation σ by the coefficient α. The coefficient α may be a value greater than 1, for example, 1.5.

Further, as shown in (A) and (B) of FIG. 11, the control unit 21 is configured to perform control to decide the start point of the section in which the measurement value has continuously exceeded the threshold 205 by a predetermined length 206, as the change start point of the measurement value. The length 206 may be set by, for example, a time, the number of measurement points (point number), etc. As a specific example, the length 206 may be set to, for example, 10 points. In this case, the start point (first point) of the section at which the measurement value has continuously exceeded the threshold 205 by 10 points is determined as the change point of the measurement value. Further, as shown in (B) in FIG. 11, even if the measurement value has exceeded the threshold 205, if it has not continuously exceeded by the predetermined length 206, the control unit 21 does not perform control to decide the point where the measurement value has exceeded the threshold 205 as the change start point of measurement value.

In FIG. 12, the first measurement data 201*a* and the second measurement data 201*b* are shown in which the alignment of the waveforms has been performed. That is, as described above, the inspection operation start point 203 is extracted from each of the first measurement data 201*a* with no damage of the wire rope 101 and the second measurement data 201*b* with damage of the wire rope 101. Then, the alignment of the waveforms is performed such that the extracted inspection operation start points 203 coincide with each other. The first measurement data 201*a* and the second measurement data 201*b* are shown in which the alignment of waveforms has been performed as described above. As shown in FIG. 12, the degree of similarity between the first measurement data 201*a* and the second measurement data 201*b* is 0.99. In other words, the waveform of the first measurement data 201*a* and the waveform of the second measurement data 201*b* have been accurately aligned.

<Position Adjustment of First Measurement Data and Second Measurement Data After Alignment>

Further, as shown in FIGS. 13 to 15, the control unit 21 is configured to perform control to finely adjust the positions of the first measurement data 201*a* and the second measurement data 201*b* in which the waveforms have been aligned.

This control is performed after the alignment of the waveforms of the first measurement data 201a and the second measurement data 201b and before the acquisition of the difference 202.

Specifically, the control unit 21 is configured to perform the following control in a state in which the waveforms of the first measurement data 201a and the second measurement data 201b have been aligned such that the inspection operation start points 203 coincide with each other. That is, the control unit 21 is configured to perform control to adjust the position of the waveform of at least one of the first measurement data 201a and the second measurement data 201b, based on the degree of similarity between the first measurement data 201a and the second measurement data 201b in which the waveforms have been aligned. The measurement data 201 to which the position adjustment of the waveforms is performed may be only one of the first measurement data 201a and the second measurement data 201b as a reference. Further, the measurement data 201 may be both of the first measurement data 201a and the second measurement data 201b.

More specifically, as shown in (A) and (B) of FIG. 13, the control unit 21 performs the adjustment by moving the position of the waveform of at least one of the first measurement data 201a and the second measurement data 201b in the time axis direction such that the degree of similarity increases from the degree of similarity before the position adjustment. The movement amount in the time axis direction depends on the data amount, but may be, for example, about several msec (several points). In (A) of FIG. 13, the distance between the first measurement data 201a and the second measurement data 201b is exaggeratedly illustrated for easier comprehension.

Further, as shown in FIG. 14, at the time of the position adjustment control, the control unit 21 is configured to perform control to divide the first measurement data 201a and the second measurement data 201b in which the waveforms have been aligned, into a plurality of divided sections 207. The divided section 207 is configured to be able to adjust the position of the waveform of the first measurement data 201a and that of the second measurement data 201b independently of the other divided sections 207. The control unit 21 is configured to perform control to adjust the position of the waveform of at least one of the first measurement data 201a and the second measurement data 201b, based on the degree of similarity, in the divided section 207. That is, the control unit 21 is configured to perform control to individually adjust the position of the waveform of at least one of the first measurement data 201a and the second measurement data 201b for each divided section 207.

In the example shown in FIG. 14, the control unit 21 performs control to divide the first measurement data 201a and the second measurement data 201b in which the waveforms have been aligned, into three divided sections. The three divided sections include a first divided section 207a, which is a section of 0 to 4 seconds, a second divided section 207b, which is a section of 4 to 8 seconds, and a third divided section 207c, which is a section of 8 to 12 seconds. In this case, the control unit 21 acquires the degree of similarity in each of the first divided section 207a, the second divided section 207b, and the third divided section 207c, independently of each other. The control unit 21 performs control to adjust the position of the waveform of at least one of the first measurement data 201a and the second measurement data 201b in such a manner that the degree of similarity is increased.

In FIG. 15, the result of the position adjustment of the second divided section 207b shown in FIG. 14 is shown. As shown in FIG. 15, the adjustment amount of the position is 2 msec, and the degree of similarity has increased from 0.99992 to 0.99995. That is, the accuracy of the waveform alignment of the first measurement data 201a and the second measurement data 201b has been improved. Further, FIG. 15 shows the difference 202 between the first measurement data 201a and the second measurement data 201b after the position adjustment. As the difference 202, the data capable of clearly distinguishing between the damage point and the non-damage point of the wire rope 101 has been obtained.

(Effects of This Embodiment)

In this embodiment, the following effects can be obtained.

In this embodiment, as described above, the inspection operation start point 203 (i.e., the information on the position of the wire rope 101) of the elevator 400 is extracted from the measurement data 201, and the alignment of the waveforms between the measurement data 201 is performed. With this, even if the information on the position of the wire rope 101 from the elevator 400 cannot be acquired, it is possible to align the waveforms between the measurement data 201. Further, it is only required to align the inspection operation start points 203 extracted from each measurement data 201 in order to align the waveforms between measurement data 201, and therefore the alignment of waveforms between the measurement data 201 can be performed via simple processing. Consequently, even in cases where the information on the position of the wire rope 101 cannot be acquired from the elevator 400, the alignment of waveforms between the measurement data 201 can be performed via simple processing.

Further, in this embodiment, as described above, it is configured such that the first measurement data 201a and the second measurement data 201b include the data in the section before the inspection operation start of the elevator 400 which is a section with a flat waveform. Further, the control unit 21 is configured to perform control to extract the change start point of the measurement value from the section before the inspection operation start of the elevator 400 as the inspection operation start point 203 of the elevator 400. With this, considering the sudden change, the change start point of the measurement from the section with a flat waveform which can be easily distinguished can be extracted as the inspection operation start point 203 of the elevator 400, and therefore it is possible to accurately extract the inspection operation start point 203 of the elevator 400.

Further, in this embodiment, as described above, the control unit 21 is configured to acquire the standard deviation σ indicating the minute fluctuations of the measurement value in the section before the inspection operation start of the elevator 400, based on the measurement value in the section before the inspection operation start of the elevator 400. Further, the control unit 21 is configured to perform control to determine the change start point of the measurement value by considering the acquired standard deviation σ. As a result, the change start point of the measurement value can be determined by considering the minute fluctuations of the measurement value in the section before the inspection operation of the elevator 400. Therefore, it is possible to suppress slight fluctuations in the measurement value in the section before the inspection operation start of the elevator 400 from being erroneously detected as a change start point of the measurement value.

Further, in this embodiment, as described above, the control unit 21 is configured to perform control to acquire the threshold 205 for determining the change start point of the measurement value, based on the standard deviation σ. The control unit 21 is configured to perform control to determine the point where the measurement value exceeds the threshold 205 as the change start point of the measurement value. As a result, the change start point of the measurement value can be determined by considering minute fluctuations of the measurement value in the section before the inspection operation start of the elevator 400 without accompanying complicated processing. Therefore, the change start point of the measurement value can be determined simply and accurately.

Further, in this embodiment, as described above, the control unit 21 is configured to perform control to determine the start point of the section where the measurement value has continuously exceeded the threshold 205 as the change start point of the measurement value. With this, even in a case where the measurement value has simply exceeded the threshold 205, the change start point of the measurement value will not be determined. Therefore, it is possible to suppress noises from being erroneously detected as the change start point of the measurement value.

Further, in this embodiment, as described above, the control unit 21 is configured to perform control to adjust the position of the waveform of at least one of the first measurement data 201a and the second measurement data 201b. This control is performed in a state in which the waveforms of the first measurement data 201a and the second measurement data 201b have been aligned such that the inspection operation start points 203 of the elevator 400 coincide with each other. This control is performed based on the degree of similarity between the first measurement data 201a and the second measurement data 201b in which the waveforms have been aligned. As a result, the following effects are obtained as compared with the case where the waveforms of the first measurement data 201a and the second measurement data 201b are simply aligned such that the inspection operation start points 203 of the elevator 400 coincide with each other. That is, the degree of similarity between the first measurement data 201a and the second measurement data 201b can be improved. Therefore, the accuracy of alignment of the waveforms of the first measurement data 201a and the second measurement data 201b can be improved.

In this embodiment, as described above, the control unit 21 is configured to perform the following control. That is, the control unit 21 adjusts the position of the waveform of at least one of the first measurement data 201a and the second measurement data 201b. The control unit 21 divides the first measurement data 201a and the second measurement data 201b in which the waveforms have been aligned, into a plurality of divided sections 207 based on the degree of similarity, in the divided section 207. With this, as compared with the case of adjusting the positions of the first measurement data 201a and the second measurement data 201b in all section positions, the degree of freedom of the position adjustment can be enhanced. As a result, the degree of similarity between the first measurement data 201a and the second measurement data 201b can be further improved by the position adjustment. Therefore, the alignment accuracy of the waveforms of the first measurement data 201a and the second measurement data 201b can be further improved.

In this embodiment, as described above, the control unit 21 is configured to acquire the difference 202 between the first measurement data 201a and the second measurement data 201b in which the waveforms have been aligned. Further, the control unit 21 is configured to perform control to inspect the state of the wire rope 101, based on the acquired difference 202. This makes it possible to inspect the state of the wire rope 101 in a state in which the noise caused by the inherent magnetic characteristics of the wire rope 101 has been removed. Therefore, it is possible to inspect the state of the wire rope 101 with higher accuracy.

[Modified Embodiment]

It should be understood that the embodiments disclosed here are examples in all respects and are not restrictive. The scope of the present invention is indicated by the appended claims rather than by the descriptions of the above-described embodiments and includes all modifications (changes) within the meanings and the scopes equivalent to the claims.

For example, in the above-described embodiment, an example is shown in which the wire rope inspection device of the wire rope inspection system performs the extraction control of the inspection operation start point and the alignment control of the waveforms between the measurement data, but the present invention is not limited thereto. In the present invention, the external device of the wire rope inspection system may perform the extraction control of the inspection operation start point and the alignment control of the waveforms between the measurement data. In this case, for example, it may be configured as follows. That is, the control unit of the external device extracts the inspection operation start point from each of the first measurement data and the second measurement data. Further, the control unit of the external device performs the alignment of the waveforms of the first measurement data and the second measurement data such that the inspection operation start point of the extracted first measurement data of the elevator and the inspection operation start point of second measurement data of the elevator coincide with each other.

Further, in the above-described embodiment, an example is shown in which the detection coil is a differential coil having a pair of receiving coils, but the present invention is not limited thereto. In the present invention, the detection coil may be configured by a single coil.

In the above-described embodiment, an example is shown in which the change start point of the measurement value is determined by considering the standard deviation indicating minute fluctuations of the measurement value in the section before the inspection operation start of the elevator, but the present invention is not limited thereto. In the present invention, the change start point of the measurement value may be determined without considering the standard deviation indicating minute fluctuations of the measurement value in the section before the inspection operation start of the elevator. For example, the change start point of the measurement value may be determined by determining a threshold based on the maximum value or the minimum value of the measurement value in the section before the inspection operation start of the elevator.

Further, in the above-described embodiment, an example is shown in which the threshold for determining the change start point of the measurement value is determined based on the measurement value in the section before the inspection operation start point of the measurement of the elevator, but the present invention is not limited thereto. In the present invention, the threshold for determining the change start point of the measurement value may be a preset value, provided that the inspection operation start point of the measurement value can be accurately extracted.

Further, in the above-described embodiment, an example is shown in which the start point of the section in which the measurement value has continuously exceeded the threshold is determined as the change start point of the measurement value, but the present invention is not limited thereto. In the present invention, the point at which the measurement value has exceeded the threshold may be determined as the change start point of the measurement value, without determining whether or not the measurement value has continuously exceeded the threshold.

Further, in the above-described embodiment, an example is shown in which the fine adjustment is performed after the alignment of the waveforms of the first measurement data and the second measurement data based on the degree of similarity between the first measurement data and the second measurement data in which the waveforms have been aligned, but the present invention is not limited thereto. In the present invention, the fine adjustment may not necessarily be performed after the alignment of the waveforms of the first measurement data and the second measurement data.

In the above-described embodiment, an example is shown in which the first measurement data and the second measurement data in which the waveforms have been aligned are divided into several divided sections and the fine adjustment of the waveforms of the first measurement data and the second measurement data is performed in the divided section. However, the present invention is not limited thereto. In the present invention, in a case where the fine adjustment after the alignment of the waveforms of the first measurement data and the second measurement data is performed, it is not always required to divide the first measurement data and the second measurement data in which the waveforms have been aligned, into several divided sections. For example, the fine adjustment after the alignment of the waveforms of the first measurement data and the second measurement data may be performed by moving the entire waveform of at least one of the first measurement data and the second measurement data in which the waveforms have been aligned.

[Aspects]

It should be understood by those skilled in the art that the above-described exemplary embodiments are concrete examples of the following aspects.

(Item 1)

A wire rope inspection system comprising:
a detection coil configured to detect a change in a magnetic field of a wire rope for driving an elevator: and
a control unit configured to perform control to inspect a state of the wire rope based on first measurement data and second measurement data acquired by the detection coil at a time of an inspection operation of the elevator, the first measurement data and the second measurement data being different in measurement date and time from each other,
wherein the control unit is configured to
extract an inspection operation start point of the elevator from each of the first measurement data and the second measurement data, and
align waveforms of the first measurement data and the second measurement data such that an inspection operation start point of the elevator of the extracted first measurement data and an inspection operation start point of the elevator of the extracted second measurement data coincide with each other.

(Item 2)

The wire rope inspection system as recited in the above-described Item 1,
wherein the first measurement data and the second measurement data include data of a section with a flat waveform before an inspection operation start of the elevator, and
wherein the control unit is configured to perform control to extract a change start point of a measurement value from the section before the inspection operation start of the elevator as the inspection operation start point of the elevator.

(Item 3)

The wire rope inspection system as recited in the above-described Item 2,
wherein the control unit is configured to perform control to
acquire a standard deviation indicating minute fluctuations of a measurement value in the section before the inspection operation start of the elevator, based on the measurement value in the section before the inspection operation start of the elevator, and
determine the change start point of the measurement value by considering the acquired standard deviation.

(Item 4)

The wire rope inspection system as recited in the above-described Item 3,
wherein the control unit is configured to perform control to
acquire a threshold for determining the change start point of the measurement value, based on the standard deviation, and
determine a point at which the measurement value has exceeded the threshold, as the change start point of the measurement value.

(Item 5)

The wire rope inspection system as recited in the above-described Item 4,
wherein the control unit is configured to perform control to determine a start point of a section in which the measurement value has continuously exceeded the threshold, as the change start point of the measurement value.

(Item 6)

The wire rope inspection system as recited in any one of the above-described Items 1 to 5,
wherein the control unit is configured to perform control to adjust a position of the waveform of at least one of the first measurement data and the second measurement data, based on a degree of similarity between the first measurement data and the second measurement data in which the waveforms have been aligned, in a state in which a waveform of the first measurement data and a waveform of the second measurement data have been aligned such that the inspection operation start points thereof coincide with each other.

(Item 7)

The wire rope inspection system as recited in the above-described Item 6,
wherein the control unit is configured to perform control to
divide the first measurement data and the second measurement data in which the waveforms have been aligned, into a plurality of divided sections, and
adjust the position of the waveform of at least one of the first measurement data and the second measurement data, based on the degree of similarity, in the divided section.

(Item 8)

The wire rope inspection system as recited in any one of the above-described Items 1 to 7,
wherein the control unit is configured to perform control to
acquire a difference between the first measurement data and the second measurement data in which the waveforms have been aligned, and inspect the state of the wire rope, based on the acquired difference.

(Item 9)

A wire rope inspection method comprising the steps of:

detecting a change in a magnetic field of a wire rope for driving an elevator; and inspecting a state of the wire rope, based on first measurement data and second measurement data acquired at a time of an inspection operation of the elevator, the first measurement data and the second measurement data being different in measurement date and time from each other, wherein the step of inspecting the state of the wire rope includes the steps of:

extracting an inspection operation start point of the elevator from each of the first measurement data and the second measurement data; and aligning a waveform of the first measurement data and a waveform of the second measurement data such that an inspection operation start point of the elevator of the extracted first measurement data and an inspection operation start point of the elevator of the extracted second measurement data coincide with each other.

DESCRIPTION OF SYMBOLS

10: Detection coil
21: Control unit
100: Wire rope inspection system
101: Wire rope
201a: First measurement data
201b: Second measurement data
202: Difference
203: Inspection operation start point
205: Threshold
207: Divided section
400: Elevator
σ: Standard deviation

The invention claimed is:

1. A wire rope inspection system comprising:
a detection coil configured to detect a change in a magnetic field of a wire rope for driving an elevator: and
a control unit configured to perform control to inspect a state of the wire rope based on first measurement data and second measurement data acquired by the detection coil at a time of an inspection operation of the elevator and before an inspection operation start of the elevator, the first measurement data and the second measurement data being different in measurement date and time from each other,
wherein the control unit is configured to
extract an inspection operation start point of the elevator from each of the first measurement data and the second measurement data, and
align waveforms of the first measurement data and the second measurement data such that an inspection operation start point of the elevator of the extracted first measurement data and an inspection operation start point of the elevator of the extracted second measurement data coincide with each other,
wherein the first measurement data and the second measurement data include both data in a section with a flat waveform before the inspection operation start of the elevator and data in an operation section after the inspection operation start of the elevator,
wherein the control unit is configured to perform control to extract a change start point of a measurement value from the section before the inspection operation start of the elevator to the operation section after the inspection operation start of the elevator as the inspection operation start point of the elevator, wherein the control unit is configured to perform control to acquire a standard deviation indicating fluctuations of the measurement value in the section before the inspection operation start of the elevator, based on the measurement value in the section before the inspection operation start of the elevator, and determine the change start point of the measurement value by considering the acquired standard deviation, and wherein the control unit is configured to perform control to acquire a threshold for determining the change start point of the measurement value, based on the standard deviation, and determine a point at which the measurement value has exceeded the threshold, as the change start point of the measurement value.

2. The wire rope inspection system as recited in claim 1, wherein the control unit is configured to perform control to determine a start point of a section in which the measurement value has continuously exceeded the threshold, as the change start point of the measurement value.

3. The wire rope inspection system as recited in claim 1, wherein the control unit is configured to perform control to adjust a position of the waveform of at least one of the first measurement data and the second measurement data, based on a degree of similarity between the first measurement data and the second measurement data in which the waveforms have been aligned, in a state in which a waveform of the first measurement data and a waveform of the second measurement data have been aligned such that the inspection operation start points thereof coincide with each other.

4. The wire rope inspection system as recited in claim 3, wherein the control unit is configured to perform control to divide the first measurement data and the second measurement data in which the waveforms have been aligned, into a plurality of divided sections, and adjust the position of the waveform of at least one of the first measurement data and the second measurement data, based on the degree of similarity, in the divided section.

5. The wire rope inspection system as recited in claim 1, wherein the control unit is configured to perform control to acquire a difference between the first measurement data and the second measurement data in which the waveforms have been aligned, and inspect the state of the wire rope, based on the acquired difference.

6. A wire rope inspection method comprising the steps of:

detecting a change in a magnetic field of a wire rope for driving an elevator; and inspecting a state of the wire rope, based on first measurement data and second measurement data acquired at a time of an inspection operation of the elevator, the first measurement data and the second measurement data being different in measurement date and time from each other, wherein the step of inspecting the state of the wire rope includes the steps of:

extracting an inspection operation start point of the elevator from each of the first measurement data and the second measurement data; and aligning a waveform of the first measurement data and a waveform of the second measurement data such that an inspection operation start point of the elevator of the extracted first measurement data and an inspection operation start point of the elevator of the extracted second measurement data coincide with each other, wherein the first measurement data and the second measurement data include data in a section with a flat waveform before an inspection operation start of the elevator, wherein the step of extracting the inspection operation start point of the elevator includes a step of extracting a change start point of a measurement value from the section before the inspection operation start of the elevator as the inspection operation start point of the elevator, wherein the step of extracting the inspection operation start point of the elevator includes a step of acquiring a standard deviation indicating fluctuations of the measurement value in the section before the inspection operation start of the elevator, based on the measurement value in the section before the inspection operation start of the elevator, and determining the change start point of the measurement value by considering the acquired standard deviation, and wherein the step of extracting the inspection operation start point of the elevator includes a step of acquiring a threshold for determining the change start point of the measurement value, based on the standard deviation, and determining a point at which the measurement value has exceeded the threshold, as the change start point of the measurement value.

* * * * *